United States Patent
Alden (10) Patent No.: US 11,430,306 B1
(45) Date of Patent: Aug. 30, 2022

(54) SMARTPHONE APPLICATION-BASED ENTERTAINMENT LIGHT SHOW HARDWARE AND SOFTWARE TIME-BASED SYNCHRONIZATION SYSTEM THAT PROVIDES A SYNCHRONIZED ENTERTAINMENT LIGHT SHOW NOT REQUIRING REAL-TIME INTERNET CONNECTION

(71) Applicant: Charles David Alden, West Valley City, UT (US)

(72) Inventor: Charles David Alden, West Valley City, UT (US)

( * ) Notice: Subject to any disclaimer, the term of this patent is extended or adjusted under 35 U.S.C. 154(b) by 0 days.

(21) Appl. No.: 17/014,899

(22) Filed: Sep. 8, 2020

Related U.S. Application Data (60) Provisional application No. 62/897,817, filed on Sep. 9, 2019.

(51) Int. Cl.
*G08B 5/22* (2006.01)
*H04W 4/021* (2018.01)
*H04W 68/02* (2009.01)
*H04M 1/72403* (2021.01)
*H04L 41/22* (2022.01)
*G06F 3/04817* (2022.01)

(52) U.S. Cl.
CPC ........ *G08B 5/221* (2013.01); *H04M 1/72403* (2021.01); *H04W 4/021* (2013.01); *H04W 68/02* (2013.01); *G06F 3/04817* (2013.01); *H04L 41/22* (2013.01); *H04M 2201/42* (2013.01)

(58) Field of Classification Search
CPC ..... H05B 47/19; G08B 5/221; G06F 3/04817; H04L 41/22; H04M 2201/42
See application file for complete search history.

(56) References Cited

U.S. PATENT DOCUMENTS

| | | | |
|---|---|---|---|
| 7,697,925 B1* | 4/2010 | Wilson | H04M 1/22 455/418 |
| 10,868,951 B2* | 12/2020 | Zima | H04N 5/232061 |
| 2012/0105466 A1* | 5/2012 | Leslie | H05B 47/19 345/589 |
| 2014/0273811 A1* | 9/2014 | Czapla | H04B 11/00 455/3.06 |
| 2015/0012308 A1* | 1/2015 | Snyder | H05B 47/155 705/5 |
| 2017/0135057 A1* | 5/2017 | Cugini | H05B 47/10 |
| 2019/0158757 A1* | 5/2019 | Zima | H04N 5/23206 |
| 2019/0289692 A1* | 9/2019 | Morita | H05B 47/155 |
| 2019/0394860 A1* | 12/2019 | Choi | H05B 45/20 |

* cited by examiner

*Primary Examiner* — Ryan F Pitaro
(74) *Attorney, Agent, or Firm* — Plager Schack LLP; Mark H. Plager; Stephen Hallberg (57) ABSTRACT

A smartphone application-based entertainment light show hardware and software timing-based synchronization system is disclosed that provides a synchronized entertainment light show not requiring real-time internet connection.

9 Claims, 4 Drawing Sheets

SMARTPHONE APPLICATION-BASED ENTERTAINMENT LIGHT SHOW HARDWARE AND SOFTWARE TIME-BASED SYNCHRONIZATION SYSTEM THAT PROVIDES A SYNCHRONIZED ENTERTAINMENT LIGHT SHOW NOT REQUIRING REAL-TIME INTERNET CONNECTION

CLAIM OF BENEFIT TO PRIOR APPLICATION

This application claims benefit to U.S. Provisional Patent Application 62/897,817, entitled "A SMARTPHONE APPLICATION-BASED ENTERTAINMENT LIGHT SHOW HARDWARE AND SOFTWARE TIME-BASED SYNCHRONIZATION SYSTEM THAT PROVIDES A SYNCHRONIZED ENTERTAINMENT LIGHT SHOW NOT REQUIRING REAL-TIME INTERNET CONNECTION," filed Sep. 9, 2019. The U.S. Provisional Patent Application 62/897,817 is incorporated herein by reference.

BACKGROUND

Embodiments of the invention described in this specification relate generally to synchronized content delivery and display, and more particularly, to a smartphone application-based entertainment light show hardware and software time-based synchronization system that provides a synchronized entertainment light show not requiring real-time internet connection.

Due to connection and network data capacity issues, current wireless and cellular technology at medium to large public and private venues is not capable of synchronizing, therefore choreographing a light show projected from the screens of the smartphones among attendees is not possible.

Therefore, what is needed is a way to synchronize a light show across multiple devices without a wireless or wired data connection.

BRIEF DESCRIPTION

A novel smartphone application-based entertainment light show hardware and software timing-based synchronization system and a time-based synchronized entertainment light show process are disclosed that provide a synchronized entertainment light show not requiring realtime internet connection.

In some embodiments, the time-based synchronized entertainment light show process includes a plurality of steps comprising (i) checking a current time of a hardware device clock of a smartphone mobile device on which a time-based synchronized entertainment light show mobile app is installed, (ii) visually outputting a graphical user interface (GUI) of the time-based synchronized entertainment light show mobile app and displaying an event host selection screen, (iii) receiving a user selection of a particular event host in the GUI of the time-based synchronized entertainment light show mobile app, (iv) displaying an event selection screen, (v) receiving a user selection in the GUI of a particular event associated with the particular event host at which a particular event light show will occur, (vi) retrieving a small data package that includes a light show timing cue process that starts at a predetermined time and runs in the background of the time-based synchronized entertainment light show mobile app during the particular event light show, (vii) retrieving an event light show start time at which time the particular event light show is scheduled to start, (viii) determining whether a time offset parameter of the time-based synchronized entertainment light show mobile app is required to be set to normalize the current time of the hardware device clock to the event light show start time, (ix) setting the time offset parameter when required to normalize the current time of the hardware device clock to the event light show start time, (x) setting a common particular time parameter of the time-based synchronized entertainment light show mobile app that aligns all users to a normalized event light show start time that accounts for any time offsets and deviations of time within a few nanoseconds of each other, (xi) receiving user input in the GUI of a section and a seat number, (xii) starting a timer in the time-based synchronized entertainment light show mobile app that continues to count down time until the event light show start time, (xiii) sending push notifications to the smartphone mobile device periodically reminding the user of the amount of time remaining until the start of the particular event light show, (xiv) initiating a background process of the time-based synchronized entertainment light show mobile app for the light show timing cue process which starts upon the timer reaching the event light show start time and continues throughout a timed duration of the particular event light show, (xv) visually outputting different light show screens at different cue times during the duration of the particular event light show, and (xvi) ending the light show timing cue process at the end of the timed duration of the particular event light show.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. For instance, a time-based synchronized entertainment light show mobile app is described which, in many cases, can alternatively be referred in this specification as "ChromaFan" mobile app. However, the examples of the time-based synchronized entertainment light show mobile app described below are not intended to be limited to any one particular mobile app and may be modified, updated, re-implemented, and otherwise altered in ways that maintain a functional connection to the several embodiments of the smartphone application-based entertainment light show hardware and software timing-based synchronization system described below. Furthermore, it will also be clear and apparent to one skilled in the art that the invention is not limited to only embodiments of the smartphone application-based entertainment light show hardware and software timing-based synchronization system set forth below, but is anticipated to cover the conceptual timing-based presentation of an entertainment light show that does not require a realtime internet or data connection for timing, and therefore, that the invention can be adapted for any of several applications.

Some embodiments of the invention include a smartphone application-based entertainment light show hardware and software timing-based synchronization system and a time-based synchronized entertainment light show process which provide a synchronized entertainment light show not requiring realtime internet connection.

In some embodiments, the time-based synchronized entertainment light show process includes a plurality of steps comprising (i) checking a current time of a hardware device clock of a smartphone mobile device on which a time-based synchronized entertainment light show mobile app is installed, (ii) visually outputting a graphical user interface (GUI) of the time-based synchronized entertainment light show mobile app and displaying an event host selection screen, (iii) receiving a user selection of a particular event host in the GUI of the time-based synchronized entertainment light show mobile app, (iv) displaying an event selection screen, (v) receiving a user selection in the GUI of a particular event associated with the particular event host at which a particular event light show will occur, (vi) retrieving a small data package that includes a light show timing cue process that starts at a predetermined time and runs in the background of the time-based synchronized entertainment light show mobile app during the particular event light show, (vii) retrieving an event light show start time at which time the particular event light show is scheduled to start, (viii) determining whether a time offset parameter of the time-based synchronized entertainment light show mobile app is required to be set to normalize the current time of the hardware device clock to the event light show start time, (ix) setting the time offset parameter when required to normalize the current time of the hardware device clock to the event light show start time, (x) setting a common particular time parameter of the time-based synchronized entertainment light show mobile app that aligns all users to a normalized event light show start time that accounts for any time offsets and deviations of time within a few nanoseconds of each other, (xi) receiving user input in the GUI of a section and a seat number, (xii) starting a timer in the time-based synchronized entertainment light show mobile app that continues to count down time until the event light show start time, (xiii) sending push notifications to the smartphone mobile device periodically reminding the user of the amount of time remaining until the start of the particular event light show, (xiv) initiating a background process of the time-based synchronized entertainment light show mobile app for the light show timing cue process which starts upon the timer reaching the event light show start time and continues throughout a timed duration of the particular event light show, (xv) visually outputting different light show screens at different cue times during the duration of the particular event light show, and (xvi) ending the light show timing cue process at the end of the timed duration of the particular event light show.

As stated above, current wireless and cellular technology at medium to large public and private venues is not capable of synchronizing due to connection and network data capacity issues. As such, choreographing a light show projected from the screens of the smartphones among attendees is not possible. Embodiments of the smartphone application-based entertainment light show hardware and software timing-based synchronization system described in this specification solve such problems by mobile application technology that does not require real-time internet connection of the smartphones of attendees (also referred to as "users" or "participants") to synchronize.

In some embodiments, the time-based synchronized entertainment light show mobile app is made available for download and upon download of the time-based synchronized entertainment light show mobile app by an event attendee, the event attendee ("user") selects their venue and enters their seating information. The user can download and install the time-based synchronized entertainment light show mobile app before the event, so long as venue and seating information can be selected/input by the user. On the day of the event, the user would receive a digital push notification to turn on the time-based synchronized entertainment light show mobile app while at the event. During the event, the user would simply hold up the smart phone with the time-based synchronized entertainment light show mobile app running and thereby participate in a massive, dynamic, choreographed light show broadcast that includes the time-based synchronized entertainment light show mobile app running on smart phones of some or all other attendees.

By providing a hardware and software-based way to synchronize across multiple smart phones of multiple attendees (or rather, among an unbounded number of smartphones), the synchronized light show can be deployed for a venue without a dependency upon real-time internet connection.

Along with downloading the time-based synchronized entertainment light show mobile app, the user would download an associated event-specific, minimally-sized digital packet that includes instructions for the smartphone to participate in the choreographed light show. The smartphone application-based entertainment light show hardware and software timing-based synchronization system obviates the need for a robust, broadband wireless network because after the initial download of the time-based synchronized entertainment light show mobile app, including the associated event-specific, minimally-sized digital packet that includes the choreographed light show, participating users simply ensure that the time-based synchronized entertainment light show mobile app is running. When launched and running on the smart phone, the time-based synchronized entertainment light show mobile app itself determines timing information based on hardware device clock time of the smart phone. Specifically, the time-based synchronized entertainment light show mobile app synchronizes all participants to a particular time (which includes a start time and a duration, for mid-show entry of users). The particular time is intricately synchronized among all smart phones within nanoseconds of each other. Once at the event venue (or any other time), the hardware and software-based time (of the user's smart phone mobile device) is checked and offset is made for the particular time synchronization, thereby eliminating the need for real-time internet connectivity.

Embodiments of the smartphone application-based entertainment light show hardware and software timing-based synchronization system described in this specification differ from and improve upon currently existing synchronization options. In particular, proprietors of events at which an audience-based light show is desired presently hire companies that supply conventional disposable Light Emitting Diode (LED) wristbands or other similar devices. However, LED wristbands, and other conventional light devices, are limited by battery life and are unable to be reused. This creates massive amounts of unnecessary plastic, rubber, batteries, and other waste. Also, there is a limit to the types of light of each wristband. In contrast, the time-based synchronized entertainment light show mobile app can display a large variety of different light screens during the light show (in a time-cued manner that aligns the synchronized time of all users).

In addition, some embodiments of the smartphone application-based entertainment light show hardware and software timing-based synchronization system improve upon the currently existing options of companies that often require sound equipment, augmented on-site wireless network and staff support, among other equipment. All of these materials and services are extremely expensive. In contrast, the smartphone application-based entertainment light show hardware and software timing-based synchronization system of the present disclosure reduces waste, material production, and expenses exponentially.

In some embodiments, the smartphone application-based entertainment light show hardware and software timing-based synchronization system is activated when each of several participating users performs a time-based synchronized entertainment light show process. In some embodiments, a time-based synchronized entertainment light show mobile app provides an interface whereby each user can complete the time-based synchronized entertainment light show process. In some embodiments, the time-based synchronized entertainment light show process includes a plurality of steps. The following list of steps of the time-based synchronized entertainment light show process is intended as an exemplary list of steps. However, a person of ordinary skill in the relevant art would appreciate that these steps are demonstrative of the steps that may be taken to engage in and participate in a light show organized by way of the smartphone application-based entertainment light show hardware and software timing-based synchronization system.

1. Select an event host
2. Select an event
3. Enter a section and seat number
4. Start timer and count down time until the starting time of the event light show
5. Start realtime entertainment light show timing cues, based on software that runs and checks time from the internal smartphone mobile device clock hardware
6. At each time cue, visually output a pre-planned light screen on the smartphone mobile device screen
7. Display different light screens, according to pre-planned entertainment light show, in conjunction with timing tracked according to the internal smartphone mobile device clock hardware (with corresponding time offsets as normalized across all attendees)
8. End the light show at end of the pre-planned entertainment light show The smartphone application-based entertainment light show hardware and software timing-based synchronization system of the present disclosure generally works by synchronizing the time-based synchronized entertainment light show mobile app (after downloading and installing on a smart phone) to a common particular time that can be deduced from any smart phone, mobile device, computing device, or other electronic device according to a hardware-based device clock. Thus, rather than synchronizing in real-time through existing wireless communication from cellular internet connectivity or WiFi connectivity, the time-based synchronized entertainment light show mobile app synchronizes with the common particular time, which is normalized across different smart phone devices, which themselves may have different local device time settings. Thus, the hardware and software-based time has to account for offsets to time which render a common particular time (normalized time) that is nearly exact (within a few nanoseconds of deviation) across the smart phones of many users intending to attend and participate in a particular event light show. As such, the common particular time (as normalized) is established so close (within nanoseconds) to each other among smartphones throughout the world that during the particular event light show, deviations in timing are not perceptible to human vision. This is, of course, dependent upon the time-based synchronized entertainment light show mobile app using the aforementioned, extremely small-sized, pre-loaded or pushed data packets for deployment and activation of the light show.

To make the smartphone application-based entertainment light show hardware and software timing-based synchronization system of the present disclosure, a person may design and develop a software application or mobile application (the "time-based synchronized entertainment light show mobile app") using any of several programming languages, and which may include database bindings for embedded local data storage, and/or any other type of integration. The person may develop the time-based synchronized entertainment light show mobile app such that one or more light show content packages, visual content display packages, or other visual content ("time-based content") are installed when the time-based synchronized entertainment light show mobile app itself is installed. The person may develop an installation package that retrieves hardware-based time information from the smart phone (or other compatible mobile device or computing device) on which the time-based synchronized entertainment light show mobile app is installed. The person may also configure the time-based synchronized entertainment light show mobile app or update settings information for the time-based synchronized entertainment light show mobile app during installation which allows the time-based content to be visually output and synchronized with an expected external time-based event.

To use the smartphone application-based entertainment light show hardware and software timing-based synchronization system of the present disclosure, a user would download the time-based synchronized entertainment light show mobile app from a source at which the time-based synchronized entertainment light show mobile app is made available for download, such as an app store for Android-based devices, or for iOS-based devices, etc. The associated administrative software will be available to clients. The users (attendees) will be able to download the time-based synchronized entertainment light show mobile app and participate in a choreographed event light show within the associated venue when attending the event, assuming they have provided the relevant information, such as section and seat location, or other location criteria for deployments in which the synchronized entertainment light show is intended for presentation at a venue without seats or sections, but which otherwise specifies a location of the user.

Figure 1:
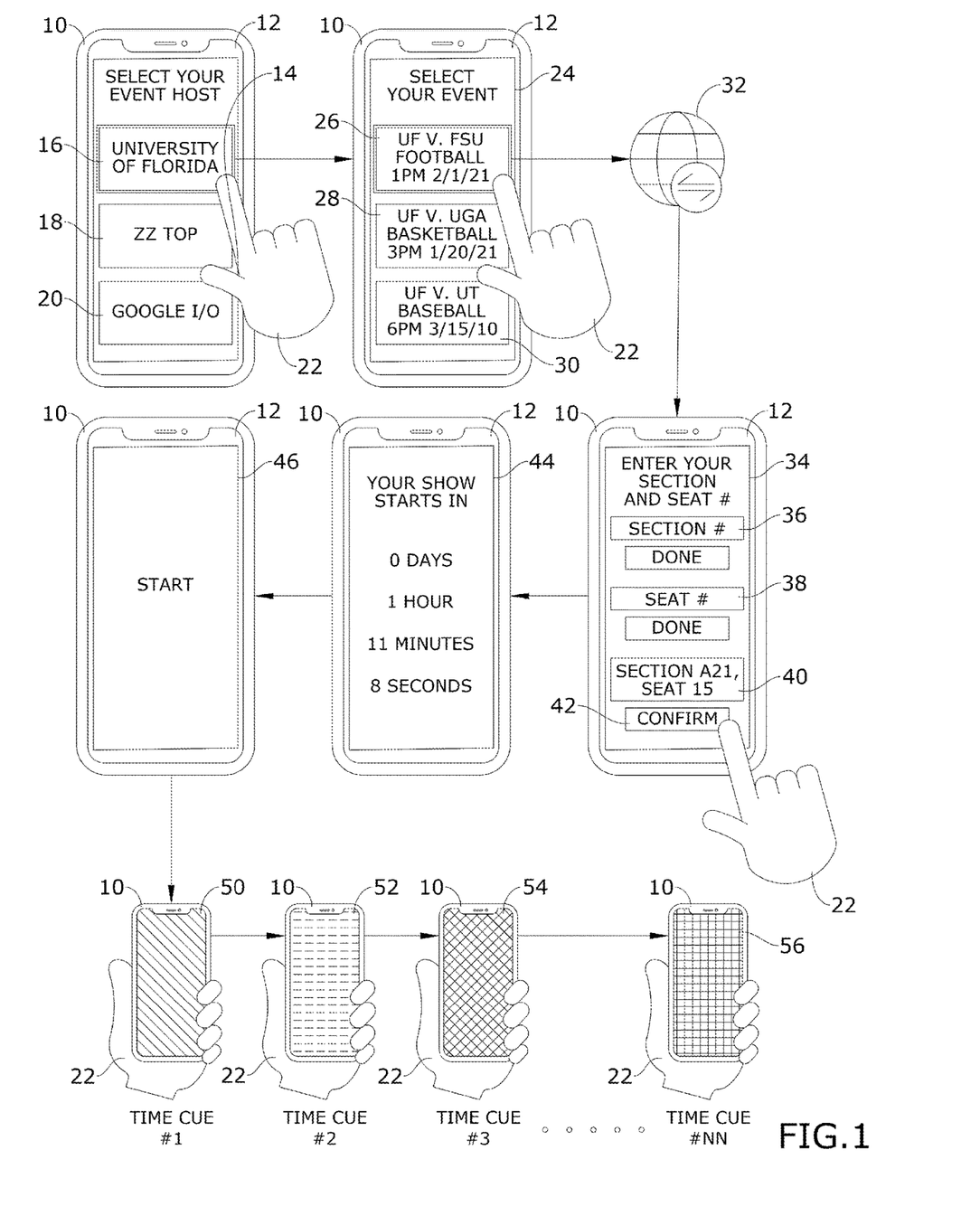
FIG. 1 conceptually illustrates a time-based synchronized entertainment light show process in some embodiments that is performed by a user interacting with a time-based synchronized entertainment light show mobile app.

By way of example, FIG. 1 conceptually illustrates a time-based synchronized entertainment light show process that is performed by a user interacting with a time-based synchronized entertainment light show mobile app. As shown in this figure, a user 22 interacts with a time-based synchronized entertainment light show mobile app 12 that is installed and running on a mobile device 10 of the user 22. The time-based synchronized entertainment light show mobile app 12 includes a graphical user interface (GUI) that presents several different screens to the user 22, including an event host selection screen 14, an event selection screen 24 at which an event light show will occur, a location selection screen 34, an event light show countdown timer screen 44, and an event light show start screen 46.

The event host selection screen 14 includes a plurality of selectable host options. In this example, the plurality of selectable host options includes a first host option 16 ("University of Florida"), a second host option 18 ("ZZ Top"), and a third host option 20 ("Google I/O"). While the example demonstrated in this figure only shows three host options, the GUI may include further host options which the user 22 can peruse for viewing or selection by scrolling down the GUI screen displayed on the mobile device 10. Nevertheless, the user 22 starts by selecting one of the host options. For example, the user 22 may select the first host option 16 ("University of Florida"), which would trigger the time-based synchronized entertainment light show mobile app to retrieve the first host option 16 as selected by the user 22. The selection of the host option by the user 22 impacts the GUI presentation of the event selection screen 24, which occurs after the user 22 completes the selection of the host. Since in this example, the user 22 has selected the first host option 16 ("University of Florida"), the event selection screen displays a limited selection of events that are related to the first host option 16 ("University of Florida"), and at which an audience-based event light show will occur. Similarly, were the user to select the second host option 18 ("ZZ Top"), the GUI would visually output events in the event selection screen 24 which are related to the second host, and at which their own particular event light shows are planned to happen.

Now, turning to the event selection screen 24, several event options are shown, including a first event option 26, a second event option 28, and a third event option 30. Each event option is associated with an event light show that is pre-choreographed and planned to occur. As noted above in connection with the displayed host options, the selectable event options that are displayed in the GUI of this example is limited to the screen space available, but may include several additional event options through which the user 22 may scroll to view and/or select. Also as described above, the selectable event options are related to the first host option 16 ("University of Florida"), which the user 22 has selected at the first stage. All of the selectable event options also have an event light show which is planned to occur. Thus, the first event option 26 pertains to a football game related to the selected first host option 16 ("UF v. FSU Football, 1 PM, Feb. 1, 2021") during which a first event light show is planned to occur (by audience participation), the second event option 28 relates to a basketball match ("UF v. UGA Basketball, 3 PM, Jan. 20, 2021") during which a second event light show is planned to occur, and the third event option 30 relates to a baseball game ("UF v. UT Baseball, 6 PM, Mar. 15, 2010") during which a third event light show is planned to occur. In the example shown in FIG. 1, the user 22 selected the first event option 26 ("UF v. FSU Football, 1 PM, Feb. 1, 2021"). By selecting this first event option 26, the user 22 has also selected a particular event light show that is planned to happen at some specific time during the first event. As the particular event light show is pre-choreographed, the user's 22 participation in the particular event light show will depend on the location at which the user 22 will be positioned for the first event option 26 at the event host venue.

After the user 22 has selected an event host and a particular event, the time-based synchronized entertainment light show mobile app retrieves a data packet 32 that includes a light show timing cue process that starts at a particular time (i.e., the planned start time of the particular event light show) and runs in the background of the time-based synchronized entertainment light show mobile app during the particular event light show.

Next, the GUI presents the location selection screen 34, which allows the user 22 to select location information, such as section number and seat number for the event light show. As shown in the location selection screen 34, a first location designation 36 is displayed for the user 22 to select or input an appropriate location identifier and a second location designation 38 for the user 22 to select or input another location identifier. In this example, the first location identifier 36 is a section number, which when input or selected by the user 22 is confirmed by the user 22 selecting a "DONE" button. The second location identifier 38 in this example is the seat number (in the user 22 provided section), which the user 22 enters or selects and then confirms by selection of the "DONE" button. After the user 22 makes selections or inputs information for the first location designation 36 and the second location designation 38, the section and seat numbers are displayed in a location designation selections view box 40, to which the user 22 may proceed by selection of a "CONFIRM" button 42.

Once confirmed, the event light show countdown timer screen 44 is displayed in the GUI of the time-based synchronized entertainment light show mobile app 12. As shown, the event light show countdown timer screen 44 visually outputs timing information for the user 22 to know how long until the particular event light show starts (e.g., "0 days, 1 hour, 11 minutes, and 8 seconds" with decreasing values displayed in realtime). When the event light show countdown timer screen 44 shows that no time is remaining until the start of the particular event light show (i.e., "0 days, 0 hours, 0 minutes, and 0 seconds"), the particular event light show is at the point of scheduled start time. In some embodiments, reminders or notifications are pushed to the time-based synchronized entertainment light show mobile app 12 as the time gets closer to start time and at the moment of start time. At that time, the event light show start screen 46 is displayed.

The event light show start screen 46 indicates that the particular event light show is presently starting (after the event light show countdown timer reaches the event light show start time). After displaying the event light show start screen 46, the time-based synchronized entertainment light show mobile app 12 visually outputs time-sequenced and time-synchronized visual displays of pre-programmed customized colors that are triggered to change at one or more pre-planned time cues. The time-sequenced and time-synchronized visual displays depend on the location information, such as the first location designation 36 (that is, the section number) and the second location designation 38 (that is, the seat number), selected in the location selection screen 34 and confirmed by the user 22. As shown, the time-sequenced and time-synchronized visual displays of pre-programmed customized colors in this example include a first displayed color 50, a second displayed color 52, a third displayed color 54, and a fourth displayed color 56. In this example, the first displayed color 50, the second displayed color 52, the third displayed color 54, and the fourth displayed color 56 are all different colors and are pre-programmed in the data packet 32 according to the choreography of the particular event light show. Other intervening time cues and/or colors may be included, indicated by the sequence of dots. Other elements for the light show may be involved too, such as different light flashing patterns or sequences, periodic darkness (no light), etc.

Specifically as shown here, the first displayed color 50 is visually output onto a screen of the mobile device 10 at time cue #1 (provided in the data packet 32 and according to the light show timing cue process that runs in the background of the time-based synchronized entertainment light show mobile app 12 during the event light show) as the user 22 holds the mobile device 10 up for the light show. The second displayed color 52 is visually output onto the screen of the mobile device 10 at time cue #2, while the third displayed color 54 is visually output onto the screen of the mobile device 10 at time cue #3, along with other possible intervening colors or flashing patterns are visually output onto the screen of the mobile device 10 after time cue #3 and before time cue #NN. Finally, the fourth displayed color 56 is visually output onto the screen of the mobile device 10 at time cue #NN, which is presumed in this example to be the last color output.

Figure 2:
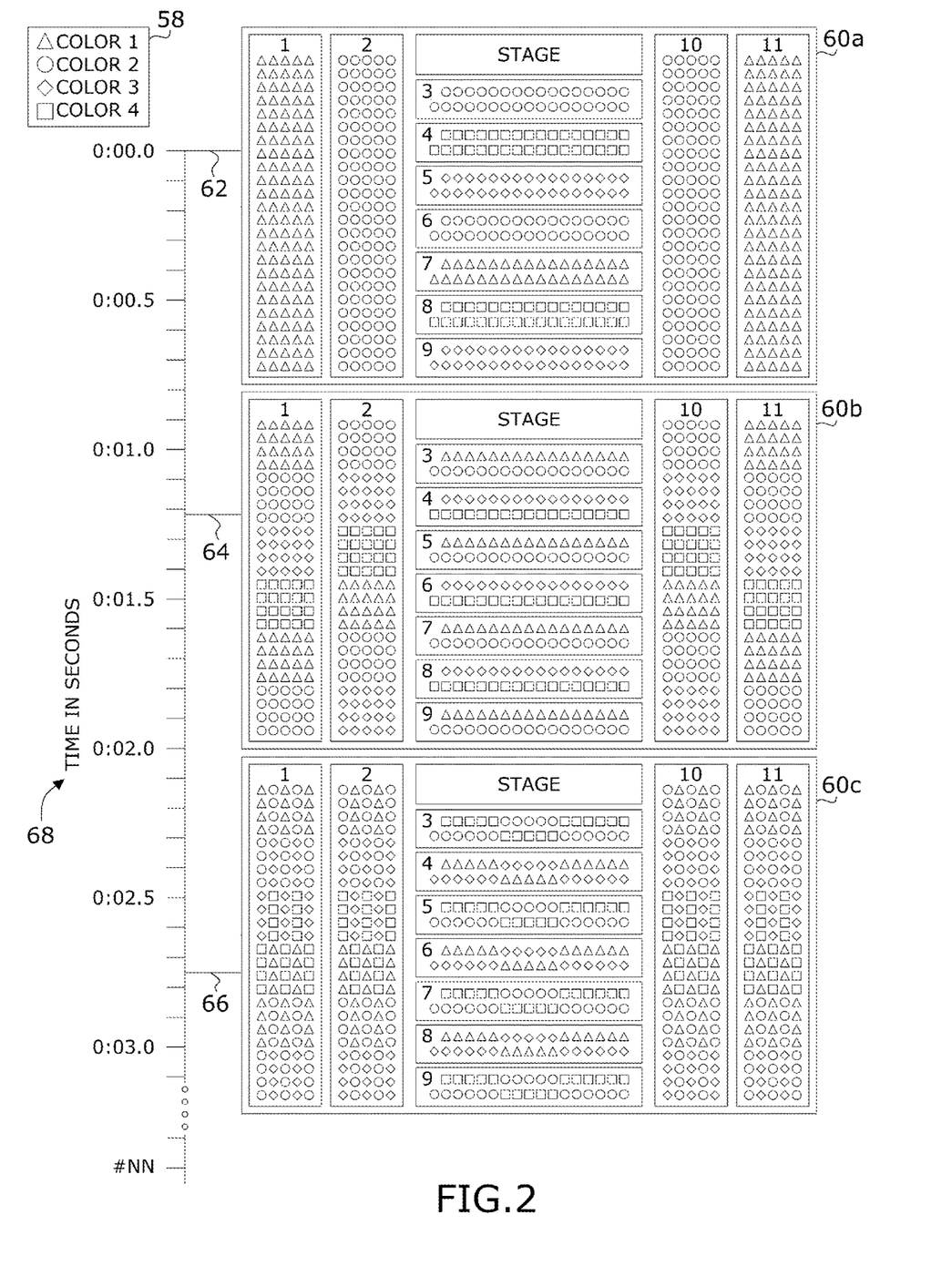
FIG. 2 conceptually illustrates a time-synchronized entertainment light show organized by a smartphone application-based entertainment light show hardware and software timing-based synchronization system and mobile device users of a time-based synchronized entertainment light show mobile app which does not require real-time internet connection in some embodiments.

Now turning to another example, FIG. 2 conceptually illustrates a time-synchronized entertainment light show organized by a smartphone application-based entertainment light show hardware and software timing-based synchronization system and mobile device users of a time-based synchronized entertainment light show mobile app which does not require real-time internet connection in some embodiments. As shown in this figure, a light show color key 58 includes four different colors that are depicted by four different shapes. While the smartphone application-based entertainment light show hardware and software timing-based synchronization system does not limit the amount of colors or light patterns that can be included for any given time-synchronized entertainment light show, the example shown in this figure is limited to four colors so as not to obscure the drawing with excessive detail. Also shown in this figure is an event venue 60 at which a time-synchronized entertainment light show occurs. The event venue 60 is shown in three snapshot times, represented as event venue 60a at a first time, event venue 60b at a second time, and event venue 60c at a third time. The event venue 60 includes eleven separate sections, and each shape shown in each section conceptually represents an attendee with a smartphone running the time-based synchronized entertainment light show mobile app. The smartphone of each attendee would be held in a position to display a color that may change at particular time cues through a timed duration of the time-synchronized entertainment light show. The timed duration of the time-synchronized entertainment light show is conceptually illustrated as a time in seconds scale 68 on the left. The time in seconds scale 68 includes time cues at which the mobile device smartphones of the users (attendees) may change color in coordination with the data packet for the particular event light show choreographed for the users/attendees at the event venue 60. In particular, this figure demonstrates a timed duration from time 0:00.0 seconds to some later endpoint beyond a time point #NN, which is dependent entirely upon the actual time duration of any given time-synchronized entertainment light show. Nevertheless, the time in second scale 68 shows three exemplary time cues, namely, a first time cue 62 at time 0:00.0, a second time cue 64 shortly after time 0:01.0, and a third time cue 66 shortly after time 0:02.5.

At the first time cue 62, the users are positioned in their respective locations within the eleven sections of the event venue 60a, and hold their smartphones to display their respective time-synchronized color for time 0:00.00. Specifically, all the users in sections 1, 7, 11 display the first color (shown in this figure by a triangle shape), all the users in sections 2, 3, 6, and 10 display the second color (shown in this figure by a circle shape), all the users in sections 5 and 9 display the third color (shown in this figure by a diamond shape), and all the users in sections 4 and 8 display the fourth color (shown in this figure by a square shape).

At the second time cue 64, the color displayed on the smartphones of many users changes, as shown in event venue 60b. In this case, different blocks of users in each section have changed the displayed color to other colors, as represented by the different shapes in the sections of the event venue 60b.

At the third time cue 66, the color displayed on the smartphones of many users has once again changed, as shown in event venue 60c. Here at third time cue 66, alternating columns in the different blocks of users in each section have changed the displayed color to other colors, as represented by the different shapes along the columns of users in the various blocks within the sections of the event venue 60c. This time-synchronized changing of the smartphone display for the users at the event venue 60 changes according to the pre-planned patterns in the data packet delivered for the participating attendees throughout the time-synchronized entertainment light show, until the end. The end of the time-synchronized entertainment light show occurs sometime after the point #NN in the time in seconds scale 68. At the end of the time-synchronized entertainment light show, the time-based synchronized entertainment light show mobile app running on the smartphone of each attendee would stop displaying the time-synchronized colors and would end. Although some smartphones of attendees may have a cellular connection, the point of the time-based synchronized entertainment light show mobile app and the smartphone application-based entertainment light show hardware and software timing-based synchronization system is that the mobile device users do not need any real-time data connectivity whatsoever since the timing of the event is synchronized for all users to a common time that is based on the internal mobile device clock hardware of their smartphone, with normalization offsets made as needed. In this way, the time-synchronized entertainment light show can be performed no matter what connectivity issues may be present for various users, since no cellular or WiFi (or other) time or data connectivity is needed during the time-synchronized entertainment light show.

Figure 3:
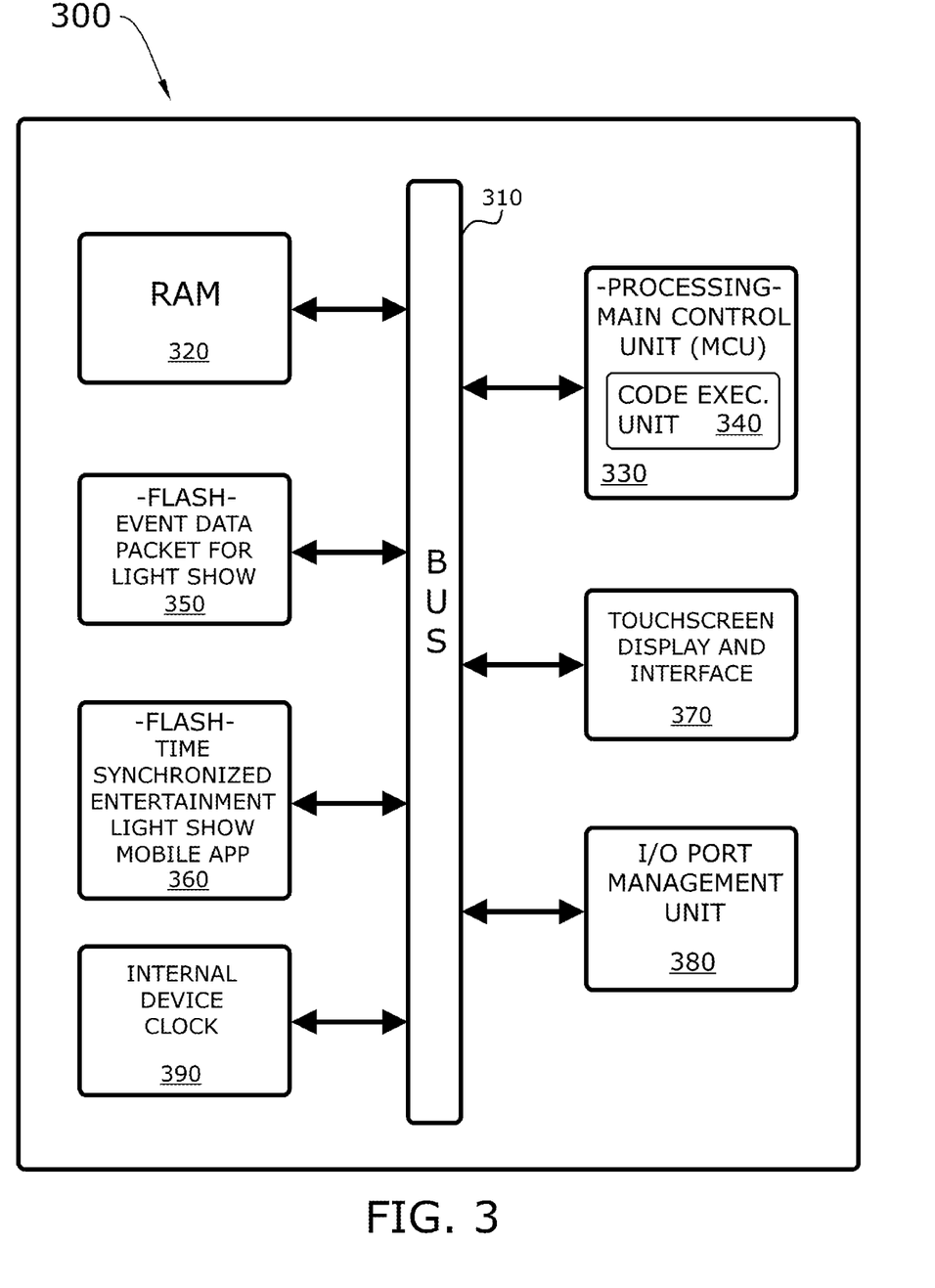
FIG. 3 conceptually illustrates a block diagram of a mobile device used by an attendee to display color for a time-synchronized entertainment light show in some embodiments.

By way of example, FIG. 3 conceptually illustrates a block diagram of a mobile device 300 used by an attendee to display color for a time-synchronized entertainment light show in some embodiments. As shown in this figure, the mobile device 300 includes a bus 310, a random access memory (RAM) 320, a main control unit (MCU) 330 for runtime processing during a time-synchronized entertainment light show, a code execution unit 340 embedded within the MCU 330 to carry out instructions of the event-specific data packet, a first persistent flash memory 350 that stores the event-specific data packet for the light show, a second persistent flash memory 360 that stores the time-based synchronized entertainment light show mobile app that is executed by code execution unit 340 of the MCU 330 to run the countdown timer and start the background process for the event from the event-specific data packet for the light show that is stored in the first persistent flash memory 350 and visually output the time-synchronized colors to the touchscreen display and interface 370, an input/output (I/O) management unit 380, and an internal device clock 390 which is used for countdown to the start of the time-synchronized entertainment light show and to track time and trigger time cues during the time-synchronized entertainment light show.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
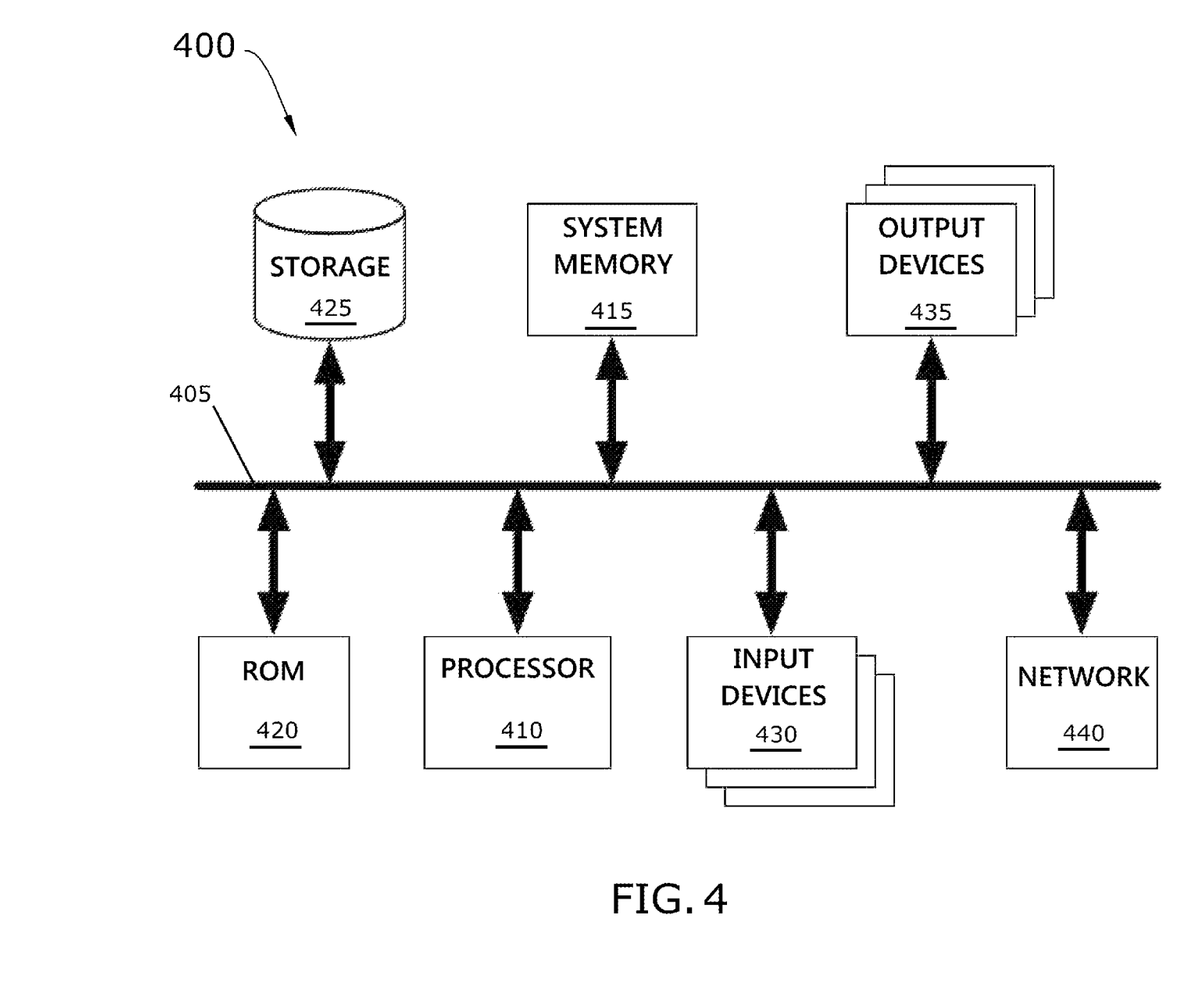
FIG. 4 conceptually illustrates an electronic system with which some embodiments of the invention are implemented.

FIG. 4 conceptually illustrates an electronic system 400 with which some embodiments of the invention are implemented. The electronic system 400 may be a mobile device, a smartphone, a tablet computing device, a light screen electronic device, or any other sort of mobile electronic device with a screen. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A smartphone application-based entertainment light show hardware and software timing-based synchronization system that provides a synchronized entertainment light show not requiring real-time internet connection, said smartphone application-based entertainment light show hardware and software timing-based synchronization system comprising:
- a plurality of mobile electronic computing devices associated with a plurality of attendees of a time-synchronized entertainment light show, each mobile electronic computing device comprising a processor, an internal hardware clock, and a storage disk;
- a data packet comprising a pre-planned light show pattern associated with the time-synchronized entertainment light show, wherein the data packet is stored in the storage disk of each mobile electronic computing device associated with the attendees of the time-synchronized entertainment light show; and
- a time-based synchronized entertainment light show mobile app that is installed on each mobile electronic computing device, stored in the storage disk of the mobile electronic computing device, and runs on the processor of the mobile electronic computing device, said time-based synchronized entertainment light show mobile app configured to (i) identify a starting time of the time-synchronized entertainment light show, (ii) identify a time offset between a device time of the internal hardware clock and a common time that is normalized across the plurality of mobile electronic computing devices associated with the plurality of attendees of the time-synchronized entertainment light show, (iii) apply the time offset to the device time of internal hardware clock to normalize the device time within fractions of a second of the common time, (iv) synchronize the starting time to the common time based on the normalized device time of the internal hardware clock, (v) identify a time difference between a current device time of the internal hardware clock and the synchronized starting time, (vi) start an event light show countdown timer that is configured to count down time from the identified time difference, (vii) count down time, by the event light show countdown timer, until the identified time difference is zero at the synchronized starting time of the time-synchronized entertainment light show, (viii) start a background process that reads the data packet and provides realtime entertainment light show timing cues at times determined by the normalized device time of the internal hardware clock without any network communication to any other device, (ix) detect the realtime entertainment light show time cues during the time-synchronized entertainment light show without any network communication to any other device, (x) visually output a lighted screen display color at each detected time cue without any network communication to any other device, and (xi) change the lighted screen display color according to the pre-planned light show pattern and a location at which the mobile electronic computing device is planned to be during the time-synchronized entertainment light show without any network communication to any other device.

2. The smartphone application-based entertainment light show hardware and software timing-based synchronization system of claim 1, wherein the data packet is a particular data packet specified for the time-synchronized entertainment light show and includes a start time for the time-synchronized entertainment light show.

3. The smartphone application-based entertainment light show hardware and software timing-based synchronization system of claim 1, wherein the event light show countdown timer uses the internal hardware clock of the mobile electronic computing device to count down time to the common time, wherein the common time comprises a time-zone free time that is normalized across the plurality of mobile electronic computing devices and is associated with a local time-zone starting time of the time-synchronized entertainment light show.

4. The smartphone application-based entertainment light show hardware and software timing-based synchronization system of claim 3, wherein when the time-synchronized entertainment light show is started, the plurality of mobile electronic computing devices detect the common time within fractions of a second of each other to simultaneously participate in the time-synchronized entertainment light show.

5. A non-transitory computer readable medium storing a time-based synchronized entertainment light show program which, when executed by a processor of a mobile computing device, allows a user to actively participate in a time-synchronized entertainment light show without any network communication from any other device, said time-based synchronized entertainment light show program comprising sets of instructions for:
- visually outputting, on a display screen of a particular mobile computing device, a graphical user interface (GUI) with an event host selection screen;
- receiving a user selection of a particular event host from an attending user interaction with the event host selection screen in the GUI;
- visually outputting, on the display screen of the particular mobile computing device, an event selection screen in the GUI;
- receiving a user selection of a particular event from the event selection screen in the GUI, said particular event associated with the particular event host at which a particular event light show is scheduled to occur by audience participation;
- retrieving a small data package, by the particular mobile computing device, said small data package comprising a light show timing cue process that is associated with the particular event light show;
- retrieving, by the particular mobile computing device, an event light show start time at which time the particular event light show is scheduled to start;
- setting a common particular time parameter, on the particular mobile computing device, wherein the common particular time parameter is set based on a difference between a time of an internal device clock of the particular mobile computing device and a common time that is normalized and aligned for devices of all attendees of the particular event light show, wherein the common particular time parameter set for the particular mobile computing device is set to a normalized event start time that accounts for any time offsets and deviations of time within fractions of a second of the common time normalized and aligned for each other device of attendees of the particular event light show;
- receiving user input in the GUI of a section and a seat number at which the attending user intends to be positioned during the particular event light show;
- starting a timer, by the internal device clock of the particular mobile computing device, wherein the timer is configured to count down time until the normalized event start time of the particular event light show;
- initiating the light show timing cue process, by the particular mobile computing device without any network communication from any other device, as a background process which starts upon the timer reaching the normalized event start time and continues throughout a timed duration of the particular event light show; and visually outputting, on the display screen of the particular mobile computing device, different light show screens at different cue times during the timed duration of the particular event light show without any network communication from any other device, wherein the different light show screens and different cue times are dependent upon the section and the seat number of the attending user for the particular event light show.

6. The non-transitory computer readable medium of claim 5, wherein the internal device clock comprises a hardware-based clock of the particular mobile computing device, wherein the particular mobile computing device comprises a smartphone mobile device operated by the attending user.

7. The non-transitory computer readable medium of claim 6, wherein the light show timing cue process runs as a background process on the smartphone mobile device of the attending user during the particular event light show without any network communication from any other device.

8. The non-transitory computer readable medium of claim 7, wherein the time-based synchronized entertainment light show program further comprises sets of instructions for:
checking a current time of the hardware-based clock of the particular mobile computing device;
determining whether a time offset is needed to normalize the current time of the hardware-based clock to the normalized event start time; and
setting the time offset when needed to normalize the current time of the hardware-based clock to the normalized event start time.

9. The non-transitory computer readable medium of claim 5, wherein the time-based synchronized entertainment light show program further comprises a set of instructions for receiving push notifications, before the normalized event start time, to remind the attending user of an amount of time remaining until the start of the particular event light show.

* * * * *